United States Patent
Klant et al.

(10) Patent No.: US 11,035,344 B2
(45) Date of Patent: Jun. 15, 2021

(54) WIND TURBINE HAVING A ROTATING ROTOR RING AND A STATIONARY RING

(71) Applicant: MEGA WINDFORCE IP BV I/O, Zaandijk (NL)

(72) Inventors: Keesjan Klant, Zwaanshoek (NL); Woud Vleugel, Nieuw-Vennep (NL)

(73) Assignee: MEGA WINDFORCE IP BV, Zaandijk (NL)

( * ) Notice: Subject to any disclaimer, the term of this patent is extended or adjusted under 35 U.S.C. 154(b) by 32 days.

(21) Appl. No.: 15/544,813

(22) PCT Filed: Jan. 22, 2016

(86) PCT No.: PCT/EP2016/051338
§ 371 (c)(1),
(2) Date: Jul. 19, 2017

(87) PCT Pub. No.: WO2016/116598
PCT Pub. Date: Jul. 28, 2016

(65) Prior Publication Data
US 2018/0010581 A1    Jan. 11, 2018

(30) Foreign Application Priority Data
Jan. 22, 2015   (CH) .......................................... 78/15

(51) Int. Cl.
*F03D 9/25* (2016.01)
*F03D 1/00* (2006.01)
(Continued)

(52) U.S. Cl.
CPC .................. *F03D 9/25* (2016.05); *F03D 1/00* (2013.01); *F03D 1/0608* (2013.01); *F03D 13/20* (2016.05);
(Continued)

(58) Field of Classification Search
CPC ...... F05B 2220/7066; F05B 2220/7068; F05B 2240/221; F05B 2240/912; F05B 2250/70;
(Continued)

(56) References Cited

U.S. PATENT DOCUMENTS 4,168,439 A * 9/1979 Palma ....................... F03D 3/06
290/44
4,289,970 A * 9/1981 Deibert ................. F03D 7/0224
290/44
(Continued)

FOREIGN PATENT DOCUMENTS

CN       101711309 A      5/2010
DE       19711869 A1      9/1998
(Continued)

OTHER PUBLICATIONS

International Search Report for PCT/EP2016/051338, dated May 2, 2016.

*Primary Examiner* — Charles Reid, Jr.
(74) *Attorney, Agent, or Firm* — Norton Rose Fulbright US LLP; Gerard Messina

(57) ABSTRACT

A wind turbine is described which includes a support structure, a rotor which includes one or multiple rotor blades and which is situated on the support structure so that the rotor is freely rotatable about a rotation axis, and a generator which is connected to the rotor and which converts the wind energy into electrical energy when the rotor is rotating. The support structure includes a stationary ring on which the rotor is rotatably guided and on which the stator of the generator is situated.

7 Claims, 3 Drawing Sheets

(51) Int. Cl.
  *F03D 13/20* (2016.01)
  *F03D 80/70* (2016.01)
  *F03D 1/06* (2006.01)
  *H02K 7/18* (2006.01)
(52) U.S. Cl.
  CPC ............ *F03D 80/70* (2016.05); *H02K 7/183* (2013.01); *F05B 2220/7066* (2013.01); *F05B 2220/7068* (2013.01); *F05B 2240/221* (2013.01); *F05B 2240/912* (2013.01); *F05B 2250/70* (2013.01); *Y02E 10/72* (2013.01); *Y02E 10/728* (2013.01)
(58) Field of Classification Search
  CPC ... Y02E 10/721; Y02E 10/725; Y02E 10/728; F03D 13/20; F03D 80/70; F03D 1/00; F03D 1/0608; F03D 9/25; H02K 7/183
  USPC .................................................... 290/55, 44
  See application file for complete search history.

(56) References Cited

U.S. PATENT DOCUMENTS

| | | | | |
|---|---|---|---|---|
| 4,720,640 A * | 1/1988 | Anderson | ............ | F03B 13/083 290/43 |
| 5,315,159 A * | 5/1994 | Gribnau | ................ | H02K 7/183 290/55 |
| 5,765,990 A * | 6/1998 | Jones | .................... | F03D 1/0608 415/2.1 |
| 7,453,166 B2 * | 11/2008 | Power, III | ................ | F03D 5/04 290/43 |
| 7,939,961 B1 * | 5/2011 | Bonnet | ................ | F03D 1/0608 290/44 |
| 7,964,978 B1 * | 6/2011 | Weissmann | ........... | F03D 1/0666 290/44 |
| 8,198,748 B1 * | 6/2012 | Korzen | .................... | H02K 7/09 290/55 |
| 8,853,881 B2 * | 10/2014 | Andrews Hoegg | ....... | F03D 1/04 290/55 |
| 2003/0137149 A1 | 7/2003 | Northrup et al. | | |
| 2007/0024060 A1 * | 2/2007 | Bacon | ................... | F03D 1/0666 290/55 |
| 2007/0278796 A1 | 12/2007 | Power et al. | | |
| 2008/0174119 A1 * | 7/2008 | Hu | ........................ | F16C 39/066 290/55 |
| 2010/0270805 A1 * | 10/2010 | Kazadi | .................. | H02K 7/183 290/55 |
| 2011/0031760 A1 * | 2/2011 | Lugg | ....................... | F03D 1/025 290/55 |
| 2011/0085909 A1 * | 4/2011 | Chapman | ................ | F03D 3/005 416/174 |
| 2011/0140451 A1 * | 6/2011 | Sharpies | ................ | H02K 7/088 290/55 |
| 2011/0291413 A1 * | 12/2011 | Wamble, III | ........... | B60L 13/04 290/44 |
| 2011/0309625 A1 * | 12/2011 | Dehlsen | ................ | F03D 1/0666 290/55 |
| 2012/0112461 A1 * | 5/2012 | Saluccio | ................. | F03D 9/11 290/50 |
| 2012/0262095 A1 * | 10/2012 | Smith | ...................... | H02K 7/09 318/135 |
| 2013/0266429 A1 * | 10/2013 | Andrews | .................. | F03D 1/04 415/182.1 |
| 2015/0008676 A1 * | 1/2015 | Duchene | ................ | F03B 11/063 290/54 |
| 2015/0056075 A1 | 2/2015 | Birarov | | |
| 2016/0195066 A1 * | 7/2016 | Hu | ......................... | F03D 3/002 290/55 |

FOREIGN PATENT DOCUMENTS

| | | |
|---|---|---|
| DE | 102011016141 A1 | 9/2012 |
| EP | 1783363 A1 | 5/2007 |
| EP | 2594787 A1 | 5/2013 |
| WO | 2008/127114 A | 10/2008 |
| WO | 2010/080043 A2 | 7/2010 |
| WO | 2011/116845 A2 | 8/2011 |
| WO | WO-2013117502 A1 * | 8/2013 |

* cited by examiner

WIND TURBINE HAVING A ROTATING ROTOR RING AND A STATIONARY RING

FIELD OF THE INVENTION

The present invention relates to a wind turbine.

BACKGROUND INFORMATION

Wind turbines according to the related art include a tower, at the free end of which a nacelle which accommodates a generator is situated. A star-shaped rotor which in most cases includes three rotor blades and which is rotatable about a central horizontal axis is mounted on the nacelle. The torque of the rotor is directly or indirectly transmitted to the generator by a gear, with the aid of a rotor shaft. Since the rotor blades have lengths of up to 85 meters, enormous mechanical forces act which push the bearings and the rotor shaft to their mechanical limits. For good efficiency, the diameter of directly driven generators must be adapted to the rotor diameter. Wind turbines having this central bearing concept have reached their physical limits.

SUMMARY

Based on the disadvantages of the described related art, an object of the present invention is to refine a generic wind turbine having an improved output. In particular, the aim is to reduce the mechanical stress on wind turbines, for the dimensions that are common nowadays, resulting in reduced effort for repair and maintenance.

The stated object is achieved with a wind turbine in which the support structure includes a stationary ring on which the rotor is rotatably guided, and on which the stator of the generator is situated. As the result of providing the stationary ring, the mechanical load on the rotor is not concentrated on a central rotation axis, but, rather, may be distributed over the circumference of the stationary ring. The mechanical load on the wind turbine according to the present invention may thus be reduced, resulting in savings for repair and maintenance. In addition, with the provided design, wind turbines having longer rotor blades may be implemented. This is not possible with the design according to the related art, since this design is pushed to the limits of its mechanical load capacity. Utilizing the stationary ring as the stator of the generator allows the generator to be integrated directly into the existing rotor-stationary ring system. Further, complicated mechanical transmission of the rotor movement to the generator is therefore not necessary. For this reason, the generator is preferably provided between the stationary ring and the rotor.

It has proven to be advantageous when the rotor is free of a connection to one of the machine elements of a shaft or an axle. The rotor is thus also free of these machine elements. Within the scope of the present patent application, the term "shaft" is understood to mean a rod-shaped machine element that is used for transmitting rotary motions and torques of the rotor and for bearing of the rotor. An axle is understood to mean a rod-shaped machine element which does not transmit torque. Since the rotor is guided on the stationary ring, a rotor shaft or a rotor axle in the form of a rod may be dispensed with. The mechanical load on the rotor is therefore not centrally transmitted to a shaft or axle, and instead may be distributed over the stationary ring, which has a larger diameter.

In one particularly preferred embodiment of the present invention, the rotor includes a rotor ring which is supported on the stationary ring via a plurality of roller bearings or rolling elements. The rolling elements may be designed as wheels or rollers. The high mechanical load which inevitably occurs with wind turbines may be distributed over the circumference of the stationary ring in the wind turbine according to the present invention. Therefore, the load does not have to be absorbed by just a few roller bearings, and instead may be distributed over many smaller roller bearings. The rolling elements of the roller bearings may be cylinders, rollers, drums, spheres, cones, etc.

In one embodiment of the present invention, the rotor includes a rotor ring which is supported in a floating manner on the stationary ring by magnetic forces. A floating magnetic bearing is advantageous in particular for high mechanical loads, since this bearing concept is not subjected to mechanical wear. The higher capital costs may thus be amortized quickly.

The present invention is preferably characterized in that generators are integrated into the roller bearings, or the roller bearings are mechanically connected to generators. It is thus possible not to use just a single generator for the conversion into electrical energy, but, rather, for many smaller generators to be connected to the roller bearings. This has the advantage that the coupling to the rotor ring may be established very easily, since the roller bearings are present anyway. Another advantage is that generators may be easily connected and disconnected, depending on the wind conditions.

It has proven to be advantageous when at least one circumferential track which transmits the rotary motion of the rotor to the roller bearings is fixed to the rotor in the circumferential direction. For this reason, the rotor ring does not require a precisely machined running surface on which the rolling elements may roll. The rails, which are circular, are easily and cost-effectively manufacturable, and may be quickly integrated into the rotor ring.

In another preferred embodiment, the ratio of the rotor diameter to the rotor blade length is 1:2, preferably 1:1.5, and particularly preferably 1:1. Despite the relatively large diameter of the rotor ring that results from these ratios, the surface for utilizing the wind is only 10% smaller than with conventional wind turbines having the same rotor diameter. The large rotor ring is able to absorb the high mechanical loads particularly well. A preferred dimensioning of the rotor ring, for example, is 50 m for a rotor blade length of likewise 50 m.

Since due to the large rotor ring, the wind turbine according to the present invention with three rotor blades is not pushed to its mechanical limits, more than three rotor blades may also be used, and/or the rotor blade length may be increased. It is thus conceivable for the wind turbine according to the present invention to be able to deliver up to 20 megawatts of power.

At least two circular rails of roller bearings are advantageously situated on the stationary ring in order to be able to better distribute the mechanical load caused by the large rotor.

In another preferred embodiment of the present invention, the generator coils are situated in the stationary ring. Withdrawal of the generated electrical current is thus particularly easy, and sliding collectors may be dispensed with.

Conversely, it is advantageous when the generator magnets are situated in the rotor. In particular when the magnets are permanent magnets, the rotor requires no line connection to the static portion of the wind turbine, thereby simplifying the design.

It is advantageous when the electrical energy generated by the generator is withdrawable at the stationary ring. Current removal at nonmoving parts is easier than at moving parts, in particular when the moving parts, such as the rotor ring, are very large.

As a result of the support structure advantageously including a T-shaped upright with a tower and a crossmember, the stationary ring being fastened to the ends of the crossmember, the stationary ring may be reliably held on the support structure, and the wind resistance of the support structure is nevertheless low.

The crossmember is advantageously rotatable about the longitudinal axis of the tower, so that the wind turbine may be turned according to the wind.

It has been proven to be advantageous when the rotor ring is situated on the stationary ring, outside same. The rotor ring may be mounted on the stationary ring, and may be removed therefrom, for example during maintenance operations on the bearing.

Further advantages and features result from the following description of one exemplary embodiment of the present invention, with reference to the schematic illustrations, which are not true to scale.

DETAILED DESCRIPTION

Figure 1:
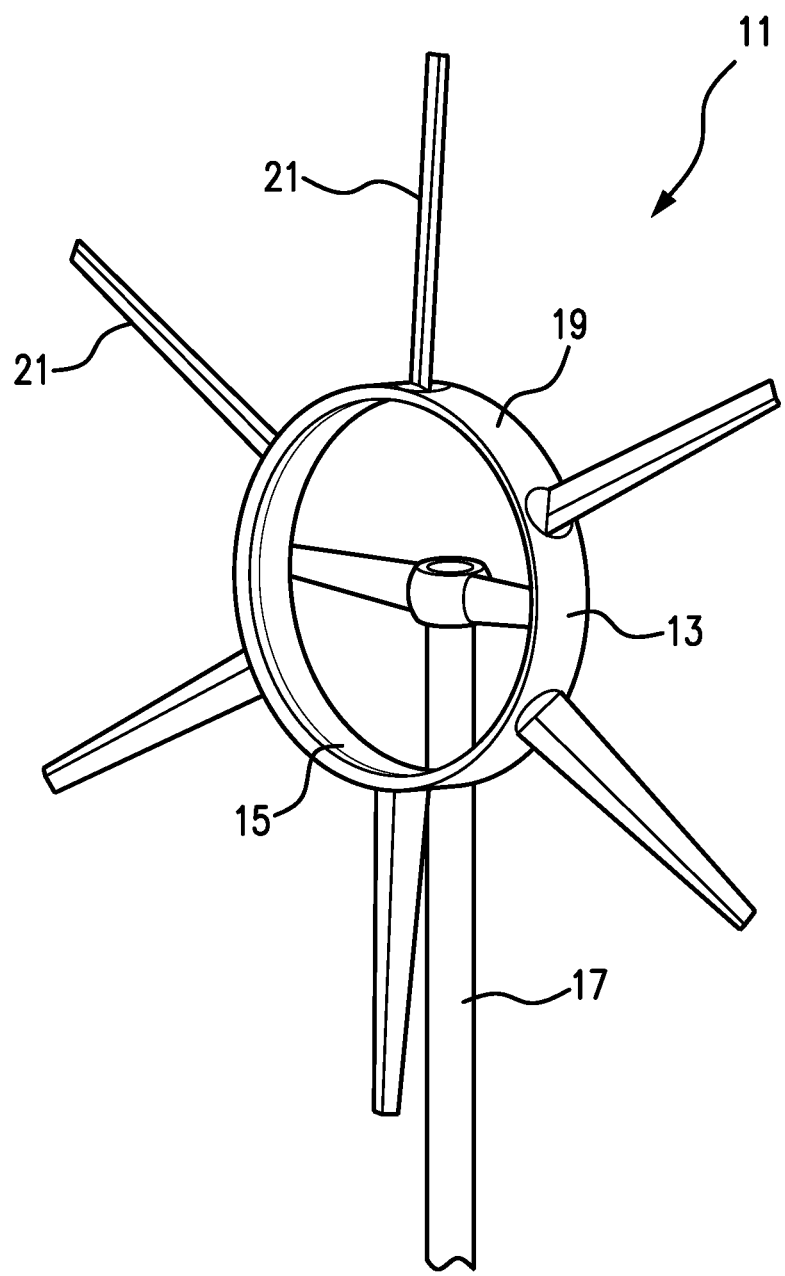
FIG. 1 shows an axonometric overall view of a wind turbine.
Figure 2:
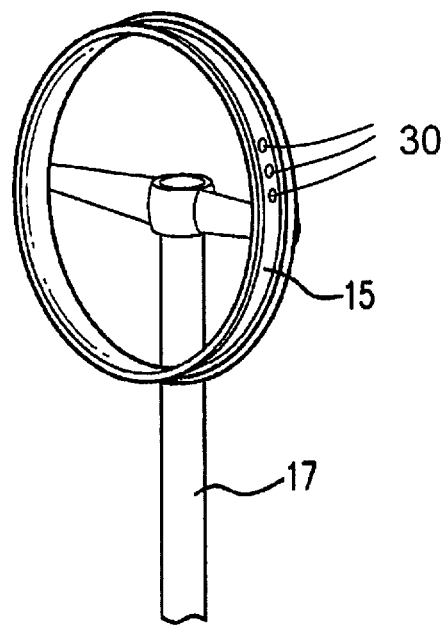
FIG. 2 shows an axonometric view of a support structure together with a stationary ring.
Figure 3:
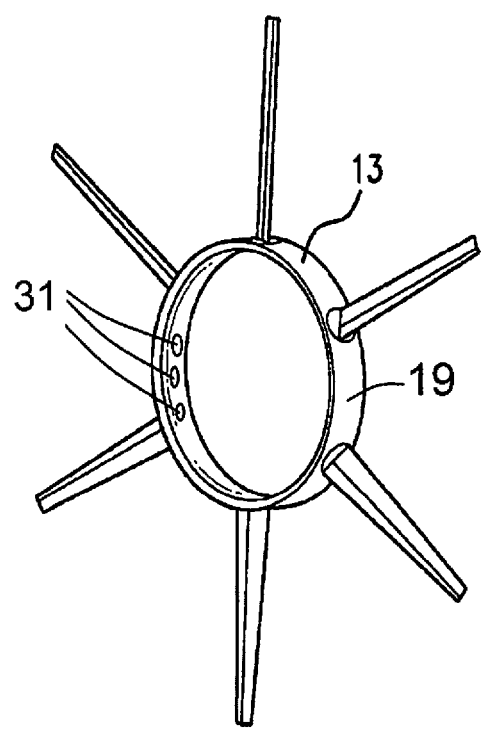
FIG. 3 shows an axonometric view of a rotor together with a plurality of rotor blades which rotates on the stationary ring.
Figure 4:
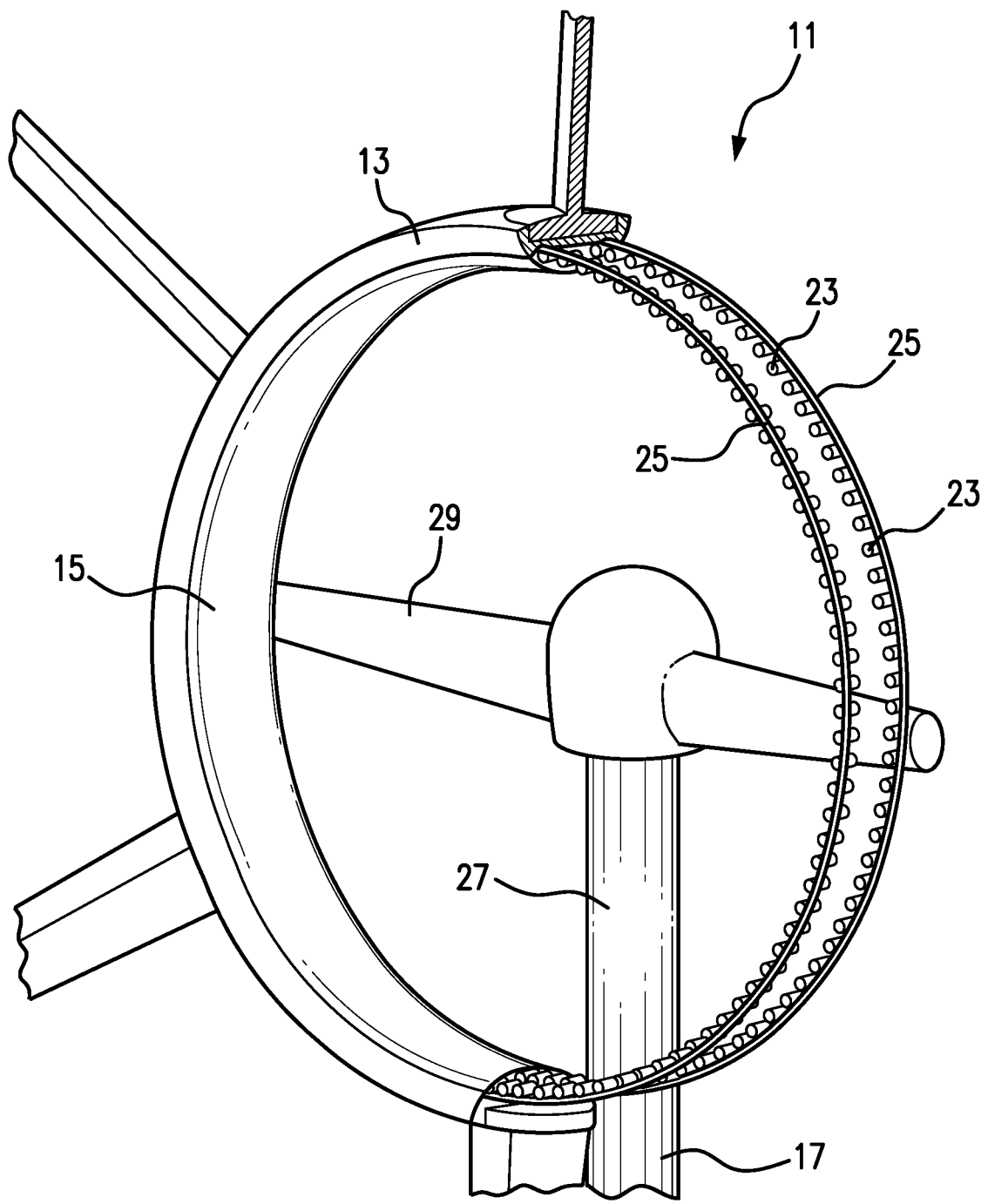
FIG. 4 shows the wind turbine in a partial cutaway view for explaining the rotor bearing.

FIGS. 1 and 4 show one embodiment of the wind turbine according to the present invention, which is denoted overall by reference numeral 11. Wind turbine 11 includes a rotor 13 which is supported so that it is rotatable about a stationary ring 15.

Stationary ring 15 is supported or held by a T-shaped upright 17.

Rotor 13 includes a rotor ring 19 and a plurality of rotor blades 21 connected to the rotor ring at the beginning of an inner end of each rotor blade. Rotor ring 19 preferably has a diameter that essentially corresponds to the length of the rotor blades as measured from an external surface of the rotor ring 19. For example, the diameter of rotor ring 19 and the length of the rotor blades is 50 meters in each case. Despite the considerable diameter of the rotor ring relative to the length of rotor blades 21, the surface area of rotor ring 19 is only 10% of the circular area defined by the free ends of rotor blades 21. The utilizable wind surface is thus only slightly reduced due to rotor ring 19. The length of rotor blades 21 may therefore be reduced by approximately ⅓, compared to the rotor blade length for wind turbines of the related art, without significantly reducing the utilizable wind surface. The material costs of wind turbine 11 according to the present invention may thus be significantly reduced, since the material costs of the rotor blades are lower.

Rotor ring 19 is rotatably guided on the outer side of stationary ring 15. The bearing may be assumed by a plurality of rolling elements 23, as shown in FIG. 4. Rolling elements 23 may be rotatably accommodated in depressions on the outer side of stationary ring 15, and situated in two or more concentric rails on stationary ring 15. Rolling elements 23 may slide directly on a running surface on the inner side of rotor ring 19, or may slide indirectly on guide rails 25. Rolling elements 23 may be wheels, rollers, drums, pins, and other rotationally symmetrical bodies. Guide rails 25 are fixedly connected to rotor ring 19, and shift the rotary motion of rotor ring 19 onto rolling elements 23. The high mechanical load resulting from the weight of the rotor blades does not have to be accommodated by a central bearing, as is the case with conventional wind turbines, and instead may be distributed over the plurality of rolling elements 23. The repair costs for wind turbine 11 may thus be reduced. It is also conceivable to increase the rotor blade length for wind turbine 11, since for the stated dimensions, the load capacity of rolling elements 23 does not reach its maximum.

It is also conceivable for the bearing of rotor ring 19 on stationary ring 15 to take place due to magnetic forces which keep rotor ring 19 suspended on stationary ring 15.

The generator of wind turbine 11, which converts the wind energy into electrical energy, is preferably situated between rotor ring 19 and stationary ring 15. Since only a motion of a magnetic field relative to an induction coil is important for a generator, it is preferred when the stator of the generator is situated in stationary ring 15, which is stationary anyway. The rotor of the generator is advantageously situated in rotor ring 19. To simplify withdrawal of the generated electrical current, it is preferred when the current withdrawal takes place at stationary ring 15, even though withdrawal using slide elements may also take place at rotor ring 19. For the simplified current withdrawal, the generator magnets 31 are thus situated in rotor ring 19, and the induction coils 30 are situated in stationary ring 15.

It is also conceivable for individual generators to be integrated into rolling elements 23, or for individual generators to be mechanically connected to rolling elements 23. Depending on the wind power, individual generators may be connected, or are disconnected by the transmission of rotation by rolling elements 23.

Wind turbines of the related art usually include three rotor blades. This number may be increased in the wind turbine according to the present invention, since due to their ring structure, the rotor blades are able to withstand higher mechanical loads.

The T-shaped upright includes a tower 27 and a crossmember 29. Stationary ring 15 is situated on the ends of crossmember 29. A sufficiently stable mounting, and at the same time, preferably low wind resistance, may be achieved in this way.

Due to providing a stationary ring 15 and a rotor ring 19, the mechanical forces may be decentralized, and do not act in a central point of the rotation axis, as is the case for wind turbines of the related art. The mechanical forces may be distributed over a plurality of rolling elements.

What is claimed is:

1. A wind turbine, comprising:
  a support structure including a stationary ring;
  a rotor including a rotor ring and a plurality of rotor blades, wherein the rotor ring is rotatably supported on the stationary ring by a bearing so that the rotor is rotatable about a horizontal rotation axis, wherein each rotor blade is connected at the beginning of an inner end of each rotor blade thereof to the rotor ring, wherein the rotor ring has a diameter, and wherein each rotor blade has a length extending from the inner end to a free end of the rotor blade, wherein:

induction coils are situated on the stationary ring;
the rotor ring of the rotor is provided with magnets;
the induction coils and the magnets form a generator that converts wind energy into electrical energy when the rotor is rotating; and
a ratio of the diameter of the rotor ring to the length of each rotor blade as measured from an external surface of the rotor ring is one of 1:2, 1:1.5, and 1:1.

2. The wind turbine as recited in claim 1, wherein the bearing supporting the rotor ring on the stationary ring comprises one of a plurality of roller bearings and a plurality of rolling elements.

3. The wind turbine as recited in claim 2, further comprising at least one guide rail that transmits a rotary motion of the rotor to the roller bearings, wherein the guide rail is fixed to the rotor in a circumferential direction.

4. The wind turbine as recited in claim 1, wherein the rotor ring is supported in a floating manner on the stationary ring by a magnetic force.

5. The wind turbine as recited in claim 1, wherein the plurality of rotor blades is at least three rotor blades.

6. The wind turbine as recited in claim 1, wherein:
the support structure includes a T-shaped upright with a tower and a crossmember, and
the stationary ring is fastened to ends of the crossmember.

7. The wind turbine as recited in claim 1, wherein the diameter of the rotor ring is one of 25 m, 33 m, and 50 m.

* * * * *